United States Patent
Allen

(10) Patent No.: US 12,463,210 B2
(45) Date of Patent: Nov. 4, 2025

(54) ELECTROLYTE AND ELECTRODE MATERIALS FOR RECHARGEABLE LITHIUM BATTERIES

(71) Applicant: U.S. Army Combat Capabilities Development Command, Army Research Laboratory, Adelphi, MD (US)

(72) Inventor: Jan L. Allen, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 261 days.

(21) Appl. No.: 17/190,911

(22) Filed: Mar. 3, 2021

(65) Prior Publication Data

US 2022/0293927 A1 Sep. 15, 2022

(51) Int. Cl.
*H01M 4/505* (2010.01)
*H01M 4/04* (2006.01)
*H01M 4/36* (2006.01)
*H01M 4/525* (2010.01)
*H01M 10/0562* (2010.01)

(52) U.S. Cl.
CPC ......... *H01M 4/505* (2013.01); *H01M 4/0471* (2013.01); *H01M 4/525* (2013.01); *H01M 10/0562* (2013.01); *H01M 4/364* (2013.01)

(58) Field of Classification Search
CPC .... H01M 4/505; H01M 4/0471; H01M 4/525; H01M 10/0562; H01M 4/366; H01M 4/485; H01M 4/364
See application file for complete search history.

(56) References Cited

U.S. PATENT DOCUMENTS

| | | | |
|---|---|---|---|
| 8,182,943 B2 | 5/2012 | Visco et al. | |
| 10,873,078 B2 | 12/2020 | Yang | |
| 10,873,106 B2 | 12/2020 | Miller et al. | |
| 10,879,524 B2 | 12/2020 | Han et al. | |
| 10,892,518 B2 | 1/2021 | Lee et al. | |
| 10,903,486 B2 | 1/2021 | Choi et al. | |
| 2009/0127503 A1* | 5/2009 | Endo | C01G 23/003 252/182.1 |
| 2013/0149593 A1* | 6/2013 | Hayashi | H01M 4/66 429/160 |
| 2014/0193689 A1* | 7/2014 | Takami | H01M 10/0562 156/60 |
| 2014/0272555 A1* | 9/2014 | Roelofs | H01M 10/0525 429/223 |

(Continued)

OTHER PUBLICATIONS

A. Liu et al. ("Study on the surface modification of spinel LiNi0.45Cr0.1Mn1.45O4", Journal of Alloys and Compounds 821 (2020) 153418) (Year: 2020).*

(Continued)

*Primary Examiner* — Matthew T Martin
*Assistant Examiner* — Adam J Francis
(74) *Attorney, Agent, or Firm* — Emily C. Moscati

(57) ABSTRACT

A composition of matter and method includes $Li_{1+x+z}M(II)_{0.5-2x-z}M(III)_{x+y}M(IV)_{1.5-2y-z}M(V)_yM(VI)_zO_4$. M(II) includes any of Mg, Co, Ni, Cu, and Zn. M(III) includes any of Al, Cr, Fe, Ga, and In. M(IV) includes any of Ti, Mn, and Ge. M(V) includes any of Nb, Ta, Sb, and Bi. Additionally, $0 \leq x \leq 0.25$, $0 \leq y \leq 0.75$, $0 \leq z \leq 0.5$, and $(x+z)>0$.

3 Claims, 12 Drawing Sheets

(56) References Cited

U.S. PATENT DOCUMENTS

| | | | |
|---|---|---|---|
| 2017/0256798 A1* | 9/2017 | Christensen | H01M 4/366 |
| 2017/0263981 A1* | 9/2017 | Satou | H01M 4/663 |
| 2018/0183093 A1* | 6/2018 | Asakawa | H01M 10/425 |
| 2019/0393482 A1* | 12/2019 | He | H01M 4/0402 |
| 2020/0194773 A1* | 6/2020 | Zankowski | H01M 8/0247 |
| 2020/0212372 A1* | 7/2020 | Wong | H01M 10/052 |
| 2020/0251772 A1 | 8/2020 | Mo et al. | |
| 2020/0259213 A1* | 8/2020 | Takano | H01M 10/0562 |
| 2022/0158179 A1* | 5/2022 | Hermann | H01M 4/382 |

OTHER PUBLICATIONS

Gellert, Michael, et al. "Charge transfer across the interface between $LiNi_{0.5}Mn_{1.5}O_4$ high-voltage cathode films and solid electrolyte films." Journal of the Electrochemical Society 162.4 (2015): A754.*

Martín, Patricia, et al. "$Li_{(4-x)/3}Ti_{(5-2x)/3}Cr_xO_4$ ($0 \leq x \leq 0.9$) spinels: new negatives for lithium batteries." Solid state sciences 9.6 (2007): 521-526.*

Rosciano, Fabio, et al. "Towards a lattice-matching solid-state battery: synthesis of a new class of lithium-ion conductors with the spinel structure." Physical Chemistry Chemical Physics 15.16 (2013): 6107-6112.*

Martin, P., et al. "Influence of Mn (III) content on physical properties and electrochemical behaviour of Li—Mn—Cr spinel-type oxides." Journal of Physics D: Applied Physics 41.1 (2007): 015405.*

High energy mechano-chemical milling: Convenient approach to synthesis of $LiMn_{1.5}Ni_{0.5}O_4$ high voltage cathode for lithium ion batteries, Materials Science and Engineering: B, vol. 190; 2014; pp. 119-125 ISSN0921-5107, https://doi.org/10.1016/j.mseb.2014.09.015. (Year: 2014).*

* cited by examiner

ELECTROLYTE AND ELECTRODE MATERIALS FOR RECHARGEABLE LITHIUM BATTERIES

GOVERNMENT INTEREST

The embodiments herein may be manufactured, used, and/or licensed by or for the United States Government without the payment of royalties thereon.

BACKGROUND

Technical Field

The embodiments herein generally relate to material science technologies, and more particularly to electrolyte and electrode materials.

Description of the Related Art

Interest in solid-state electrolytes has intensified owing to the discovery of fast lithium ion conduction in the garnet structure, the continued push for higher energy density batteries, and the allure of the safety of an inorganic fully solid-state battery. The spinel is a highly suitable cubic structure to search for fast Li-ion conduction owing to its network of edge-shared octahedra bridged by face-shared tetrahedra which connect in three dimensions thereby enabling 3D Li$^+$-ion conduction. In fact, LiMn$_2$O$_4$ spinel's favorable mixed electronic-ionic conductivity have enabled its use as a positive electrode. Li occupies the 8a tetrahedral site and shares faces with an empty 16c octahedral site, thus forming a three-dimensional 8a→16c→8a conduction pathway in the Fd-3m space group. However, limited work has been done on spinel structured solid electrolytes and pathways towards increasing the ionic conductivity in the spinel structure which is applicable to development of an all-solid-state battery. Researchers have discovered a conductivity of about 10$^{-7}$ Scm$^{-1}$ for the ordered (P4$_3$32 space group) spinel LiNi$_{0.5}$Ge$_{1.5}$O$_4$ at 63° C. The Ni and Ge are ordered on the octahedral sites of this compound. Conventional solutions have provided for an all-solid all-spinel battery as a means to reduce interfacial impedance at the interface of the solid-state cathode, electrolyte and anode but have not identified a suitable solid-state electrolyte. A Li doped MgAl$_2$O$_4$ spinel may be a potential solid-state electrolyte based on high Li diffusivity as measured by NMR as a means to enable a full spinel concept. However, the Li motion may be localized in Li doped MgAl$_2$O$_4$ and therefore the long-range Li conductivity is generally insufficient for realization of an all-solid all-spinel battery.

The conventional solutions have several deficiencies such as:

(1) Conventional Li-ion battery electrolytes are typically flammable. (2) Conventional Li-ion battery electrolytes are not stable at greater than 4.5V so they generally cannot be used for emergent 5 V cathodes such as LiNi$_{0.5}$Mn$_{1.5}$O$_4$ (LNMO) which is sought because it is completely Co free, high power and high energy. (3) Conventional R&D on solid-state batteries has the problem of the interface between the solid electrolyte and the solid cathode. These interfaces are poor Li$^+$ ion conductors and often during consolidation new impurity phases are formed. (4) Sulfide electrolyte materials are generally reactive with air and difficult to handle. Toxic sulfide gases might form during decomposition of batteries based on these materials during abusive conditions and they require difficult handling under inert gases during manufacture. (5) Li$_7$La$_3$Zr$_2$O$_{12}$, garnet, the leading contender for an oxide-based solid-state battery is based on heavy elements and would decrease the energy density of the battery. (6) Conventional batteries generally cannot support a high Li-ion current owing to the poor Li-ion conductivity of the electrode materials. Thus, at high discharge or at high charge rates, a full Li-ion capacity cannot be achieved. (7) Lack of electrolyte for LNMO.

SUMMARY

In view of the foregoing, an embodiment herein provides a composition of matter comprising Li$_{1+x+z}$M(II)$_{0.5-2x-z}$M(III)$_{x+y}$M(IV)$_{1.5-2y-z}$M(V)$_y$M(V)$_z$O$_4$, wherein M(II) comprises any of Mg, Co, Ni, Cu, and Zn, wherein M(III) comprises any of Al, Cr, Fe, Ga, and In, wherein M(IV) comprises any of Ti, Mn, and Ge, wherein M(V) comprises any of Nb, Ta, Sb, and Bi, and wherein 0≤x≤0.25, 0≤y≤0.75, 0≤z≤0.5, and (x+z)>0. The composition of matter comprises a spinel crystal structure and composites with Li$_3$BO$_3$ (LBO). The spinel crystal structure comprises a single-phase spinel structure. The spinel crystal structure and composites with Li$_3$BO$_3$ (LBO) function as solid-state electrolytes and cathodes. The solid-state electrolytes form an electrochemically-active solid solution with a spinel electrode. The spinel electrode may comprise LiNi$_{0.5}$Mn$_{1.5}$O$_4$ (LNMO). The spinel electrode may comprise LiMn$_2$O$_4$. The spinel electrode may comprise Li$_4$Ti$_5$O$_{12}$. The composition of matter may comprise a Li$_3$N coating.

Another embodiment provides a method comprising preparing a compound comprising Li$_{1+x+z}$M(II)$_{0.5-2x-z}$M(III)$_{x+y}$M(IV)$_{1.5-2y-z}$M(V)$_y$M(V)$_z$O$_4$, wherein M(II) comprises any of Mg, Co, Ni, Cu, and Zn, wherein M(III) comprises any of Al, Cr, Fe, Ga, and In, wherein M(IV) comprises any of Ti, Mn, and Ge, wherein M(V) comprises any of Nb, Ta, Sb, and Bi, wherein 0≤x≤0.25, 0≤y≤0.75, 0≤z≤0.5, and wherein (x+z)>0; dissolution of precursors of the compound into aqueous citric acid and nitric acid to obtain an aqueous solution; heating the aqueous solution to form a precipitate; and heating the precipitate at 400-1100° C.

The compound comprises a spinel crystal structure and composites with Li$_3$BO$_3$ (LBO). The spinel crystal structure comprises a single-phase spinel structure. The spinel crystal structure and composites with Li$_3$BO$_3$ (LBO) function as solid-state electrolytes and cathodes. The solid-state electrolytes form an electrochemically-active solid solution with a spinel electrode. The spinel electrode may comprise LiNi$_{0.5}$Mn$_{1.5}$O$_4$ (LNMO). The spinel electrode may comprise LiMn$_2$O$_4$. The spinel electrode may comprise Li$_4$Ti$_5$O$_{12}$. The method may comprise coating the precipitate with Li$_3$N.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
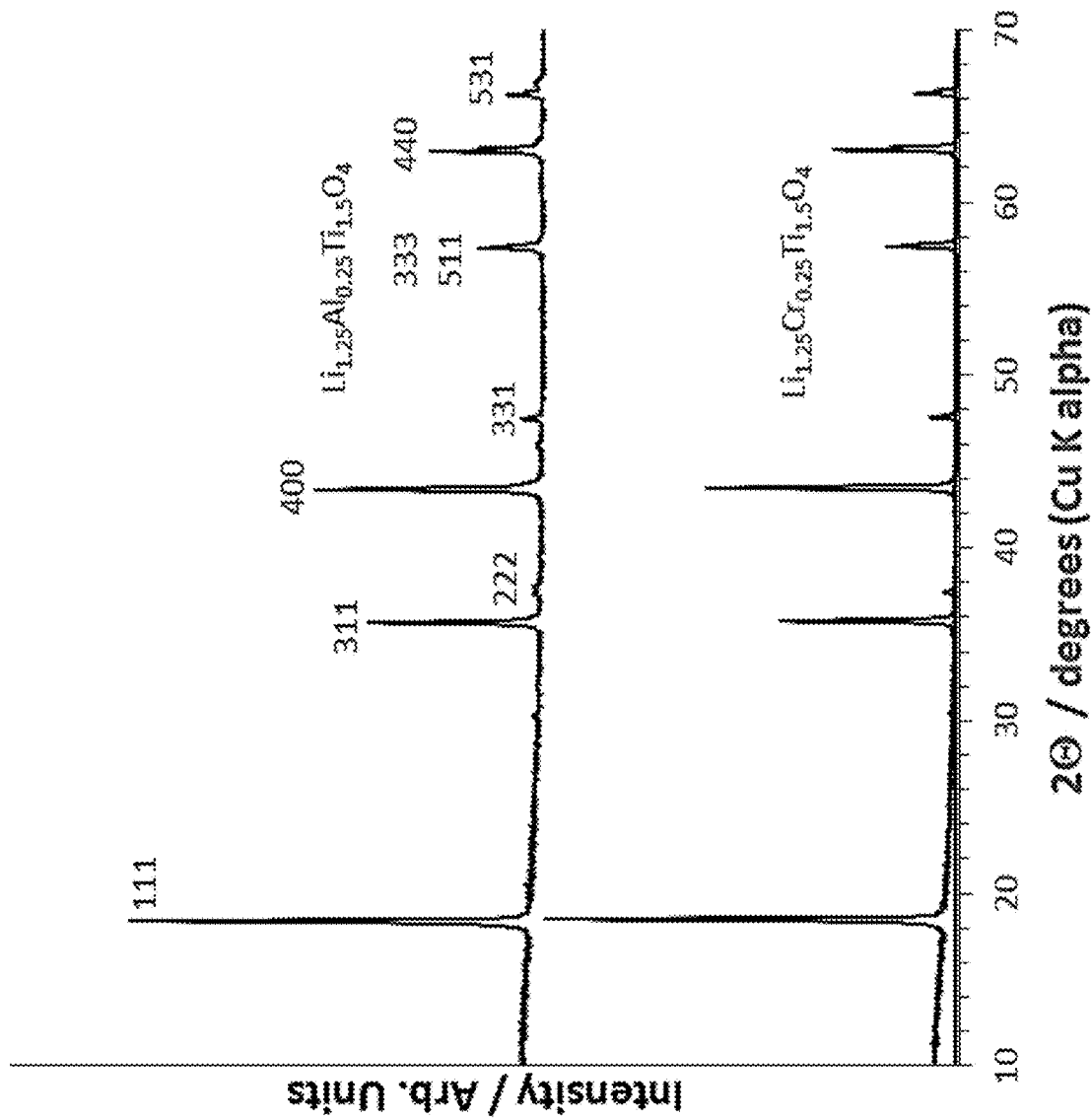
FIG. 1 is an X-ray diffraction (XRD) plot of $Li_{1.25}Cr_{0.25}Ti_{1.5}O_4$ solid electrolyte powder (bottom) and $Li_{1.25}Al_{0.25}Ti_{1.5}O_4$ solid electrolyte powder (bottom), wherein the XRD peaks are indexed to the Fd-3m spinel structure, according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as not to unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide spinel-structured compounds of compositional family $Li_{1+x+z}M(II)_{0.5-2x-z}M(III)_{x+y}M(IV)_{1.5-2y-z}M(V)_yM(V)_zO_4$ where M(II)=Mg, Co, Ni, Cu, and/or Zn, M(III)=Al, Cr, Fe, Ga, and/or In, M(IV)=Ti, Mn, and/or Ge, M(V)=Nb, Ta, Sb, and/or Bi, and where $0 \le x \le 0.25$, $0 \le y \le 0.75$, $0 \le z \le 0.5$, and $(x+z)>0$. Composites with $Li_3BO_3$ (LBO) are provided as solid-state electrolytes and cathodes.

The solid electrolytes function to replace the separator, typically a polymer sheet and the flammable solution of a lithium salt in an organic solvent. The solid electrolyte allows transport of Li ions from the positive electrode to the negative electrode and vice versa while acting as an electronic insulator. The electrons travel through an external circuit creating a DC current. Furthermore, the composition of new solid electrolytes provided by the embodiments herein form an electrochemically-active solid solution with spinel electrodes such as $LiNi_{0.5}Mn_{1.5}O_4$ (LNMO). This will enable a single-phase fully-solid electrode of high $Li^+$ conductivity eliminating multi-phase interface incompatibility problems which are observed in multi-phase solid electrolyte-solid cathode composites that are conventionally being implemented for next generation solid-state batteries. High solid-state ionic conductivity in solid solutions with LNMO are of interest owing to the lack of a stable electrolyte that can function near 5 V. A solid electrolyte is an enabling technology for this electrode material. Furthermore, these solid solutions can be used in a conventional cell with current state of the art liquid electrolytes to enable thick electrodes which typically cannot be used with current electrode materials since the Li diffusion is too poor and a concentration gradient forms reducing the available energy density that can be utilized particularly at higher power discharges.

The materials possess fast Li-ion conductivity near to the highest ever achieved for air stable, oxide electrolytes and possess utility for use in lithium rechargeable batteries as solid-state electrolyte or solid-state cathode materials. Experimentally, the maximum, room temperature bulk $Li^+$-ion conductivity obtained without the addition of LBO is $1.63 \times 10^{-4}$ S cm$^{-1}$ for the composition $Li_{1.25}Cr_{0.25}Ti_{1.5}O_4$ and it is discovered that densification with LBO increases density, and ionic and electronic conductivity reaching a maximum total $Li^+$ ion conductivity of $7.29 \times 10^{-4}$ S cm$^{-1}$ nearing the maximum ever reported for oxides ($\sim 10^{-3}$ S cm$^{-1}$). Electronic conductivity ranges from $4.10 \times 10^{-5}$ to $7.11 \times 10^{-4}$ S cm$^{-1}$ for the composition $Li_{1.25}Cr_{0.25}Ti_{1.5}O_4/1$ wt. % LBO. The solid electrolytes provided by the embodiments herein form an electrochemically-active solid solution with spinel electrodes such as $LiNi_{0.5}Mn_{1.5}O_4$. This enables a single-phase fully-solid electrode of high $Li^+$ conductivity eliminating multi-phase interface incompatibility problems which are observed in multi-phase solid electrolyte-solid cathode composites and have applicability in conventional cells. High solid-state ionic conductivity in solid solutions with LNMO are of interest owing to the lack of a stable electrolyte that can function near 5 V. A solid electrolyte is an enabling technology for this electrode material.

The use of a spinel structured solid electrolyte as a separator in an all solid-state battery and pursuit of high conductivity in the spinel structure can lead to insights that may improve rate capability of spinel structured electrodes for use with liquid based electrolytes or as a catholyte or anolyte in a fully solid-state configuration. The embodiments herein provide a solution that leads to $Li^+$ on both the tetrahedral and octahedral sites which can enable room temperature $Li^+$ ionic conductivity greater than $10^{-4}$ S cm$^{-1}$ in a spinel-structured solid. The composition of highest conductivity, $Li_{1.25}Cr_{0.25}Ti_{1.5}O_4$, contains Ti(IV) which is unstable to Li reduction, however, use of an interfacial layer such as $Li_3N$ can fix this problem to enable its use with Li or $IC_6$ anodes or the technique can be used in solid solutions formation with spinel-structured cathodes. The embodiments herein provide a solid solution of a spinel electrolyte and the $LiNi_{0.5}Mn_{1.5}O_4$ high voltage, spinel-structured positive electrode material to be a viable cathode material.

The embodiments herein provide a composition of matter comprising $Li_{1+x+z}M(II)_{0.5-2x-z}M(III)_{x+y}M(IV)_{1.5-2y-z}M(V)_yM(V)_zO_4$, wherein M(II) comprises any of Mg, Co, Ni, Cu, and Zn, wherein M(III) comprises any of Al, Cr, Fe, Ga, and In, wherein M(IV) comprises any of Ti, Mn, and Ge, wherein M(V) comprises any of Nb, Ta, Sb, and Bi, and wherein $0 \leq x \leq 0.25$, $0 \leq y \leq 0.75$, $0 \leq z \leq 0.5$, and $(x+z) > 0$. The composition of matter comprises a spinel crystal structure and composites with $Li_3BO_3$ (LBO). The spinel crystal structure comprises a single-phase spinel structure. The spinel crystal structure and composites with $Li_3BO_3$ (LBO) function as solid-state electrolytes and cathodes. The solid-state electrolytes form an electrochemically-active solid solution with a spinel electrode. The spinel electrode may comprise $LiNi_{0.5}Mn_{1.5}O_4$ (LNMO). The spinel electrode may comprise $LiMn_2O_4$. The spinel electrode may comprise $Li_4Ti_5O_{12}$. Moreover, the composition of matter may comprise a $Li_3N$ coating applied thereon.

The spinel is a highly suitable cubic structure to search for fast lithium-ion (Li-ion) conduction owing to its network of edge-shared metal-oxygen octahedra bridged by face-shared metal-oxygen tetrahedra which connect in three dimensions thereby enabling 3D Li-ion conduction. The compositional family described herein forms spinel structured materials with Li occupying both the octahedral and tetrahedral sites thereby increasing its Li-ion conductivity at room temperature. The conductivity near to that of liquid electrolytes is great enough to possess utility as solid electrolytes for lithium rechargeable batteries. Moreover, the formation of solid solutions between the solid electrolyte with spinel structured electrode materials enable interface free solid cathodes with sufficient Li-ion mobility for application in fully solid-state Li-ion cells unlike the conventional solutions, which attempt to sinter two phases together thereby forming interfaces which are highly resistant to Li-ion conductivity. The embodiments herein are based on oxides which are inherently air stable and can be handled in air. Moreover, the embodiments herein may enable higher rates of charge and discharge in conventional batteries and in a fully spinel structure, fully solid-state configuration.

Experiment

The specific parameters, values, amounts, ranges, materials, types, brands, etc. described below are approximates and are merely selected for the experiments, and as such the embodiments herein are not limited to the specific descriptions below.

Powder Preparation

The compound $Li_{1.25}Cr_{0.25}Ti_{1.5}O_4$ was prepared by solid-state reaction from a stoichiometric ratio of $TiO_2$, and $Cr_2O_3$ and a 3% stoichiometric excess of $Li_2CO_3$ to counteract volatilization of Li. The precursors were ground by hand using a mortar and pestle then the fine, mixed powder was heated in an uncovered alumina crucible at 10° C. per minute to 600° C. and held at this temperature for 10 h in air. After furnace cooling, the powder was reground and pelletized using a SPEX® SamplePrep 13 mm diameter pellet die (available from MSI Holdings, LLC, New Jersey, USA) and Carver® laboratory press (available from Wabash Metal Products, Inc., Indiana, USA).

The pellet was placed in a covered alumina crucible and heated at 10° C. to 850° C. and held at this temperature for 24 h in air and then allowed to furnace cool. $Li_{1.25}Al_{0.25}Ti_{1.5}O_4$ and $Li_{1.25}Cr_{0.25}Mn_{1.5}O_4$ was prepared similarly substituting $Al_2O_3$ for $Cr_2O_3$ and $MnCO_3$ for $Al_2O_3$ or $Cr_2O_3$, respectively. Solid solutions of the solid electrolyte and the LNMO cathode were either prepared by mixing the pre-made materials and firing at 850° C. or starting from the composition of the end product through a solution based route from $Li_2CO_3$, $MnCO_3$, $Ni(OH)_2$, $Cr(NO_3)_3.9H_2O$ precursors dissolved in a citric acid/nitric acid solution. As an example $Li_{1.025}Cr_{0.025}Ni_{0.45}Mn_{1.5}O_4$ was prepared from 0.2535 g $Li_2CO_3$ (3% excess), 1.1208 g $MnCO_3$, 0.2711 g $Ni(OH)_2$, and 0.08 g $Cr(NO_3)_3.9H_2O$, 1 g citric acid and 6 g concentrated $HNO_3$ diluted to 30 mL with $H_2O$. The clear green solution obtained from heating the mixture was evaporated to dryness and then heated under air at 10° C. per minute to 450° C., held for 3 h, heated at 10° C. per minute to 850° C., held for 6 hours, then furnace cooled.

Consolidation of Samples for Conductivity Measurements

Sintering to obtain dense pellets was attempted in air at 850° C. The temperature could not be raised higher owing to the transformation of the spinel-structured phase to a ramsdellite-structured phase at higher temperatures. Sintering pure $Li_{1.25}Cr_{0.25}Ti_{1.5}O_4$ led to pellets of low density (~60-70% relative density) and the temperature could not be increased owing to the formation of a ramsdellite-structured phase at higher temperature. The addition of $Li_3BO_3$ (LBO) as sintering aid led to much higher density pellets (~80-85%). Furthermore, very dense discs (>90%) were prepared by rapid induction hot-pressing with (near 100%) and without (93-97%) the sintering aid. For the higher conducting, $Li_{1.25}Cr_{0.25}Ti_{1.5}O_4$, three different amounts of LBO were tested in the hot-press (1, 1.5 and 3 wt. %) in an attempt to optimize conductivity. For the $Li_{1.25}Al_{0.25}Ti_{1.5}O_4$, a 3 wt. % LBO-containing hot-pressed sample was prepared based on sintering studies to increase density. The powders were hot-pressed at 850° C. at 40 Mpa for 40 min under Ar using a rapid induction hot-pressing technique. The spinel powders were pressed in a graphite die. During the hot-pressing, the die is contained in a stream of Ar, creating a reducing atmosphere. After, hot-pressing in the presence of LBO, the pellets changed to a black color. In the absence of LBO, no color change was observed. Attempts to oxidize the reduced LBO containing samples in the presence of mother power to reduce Li loss by heating under air were unsuccessful. The bulk density of the hot-pressed sample was determined from the weight and physical dimensions. The relative density values were determined by dividing the measured density by the theoretical crystal density based on the spinel structure and the measured lattice constants.

X-Ray Diffraction

X-ray diffraction (Cu Kα radiation, Rigaku® Miniflex 600, D/teX Ultra silicon strip detector (available from Rigaku Americas Corporation, Texas, USA)) was used to characterize the phase purity of the powders and the material after hot-pressing. To determine phase purity and for Rietveld structural analysis, data were collected from 10-90° 2θ at 0.01° increments at 5° per minute. Lattice constants were calculated from Rietveld refinement of an X-ray diffraction pattern collected for the sample mixed with a NIST traceable Si internal peak position standard. Data were collected from 10-120° 2θ at 0.01° increments at 10° per minute.

Conductivity

The temperature dependent, ionic conductivity was determined from AC measurements with a BioLogic™ VMP300 galvanostat/potentiostat (available from Biologic, Seyssinet- Pariset, France) and a Solartron Modulab® frequency response analyzer (available from Advanced Measurement Technology, Inc., Tennessee, USA). Two configurations were used for electrochemical impedance spectroscopy (EIS). Au or Ni was sputtered on the top and bottom of the hot-pressed discs to serve as blocking electrodes, where Au is limited by Li diffusion into itself at low frequency and Ni is fully blocking of Li. The applied frequency range was 0.1 Hz-7 MHz and the applied amplitude was 10 mV. The equivalent circuit was modelled, and each data set was normalized to the geometric dimensions of the disc to determine the total Li-ion conductivity. The Li-ion conduction activation energy was determined from the Arrhenius plot of the relationship of the conductivity to temperature in the range of ~298K to 373K.

The electronic conductivity at room temperature was measured using DC polarization measurements at a voltage of 2 V. The steady-state current and applied voltage were used to determine the resistance, which was converted to the electronic conductivity using the specimen dimensions. Electronic conductivity, which was in good agreement with the DC obtained electrical conductivity, was also estimated from the AC impedance data to fit the electrochemical impedance spectroscopy (EIS) data for the LBO containing samples along with the circuit components attributed to the ionic conductivity.

Electrochemical Measurements

Solid solution electrodes of composition $Li_{1.25}Cr_{0.25}Mn_{1.5}O_4$:$LiNi_{0.5}Mn_{1.5}O_4$ of 30:70 ($Li_{1.075}Cr_{0.075}Ni_{0.35}Mn_{1.5}O_4$) were mixed with carbon and PVDF in an NMP slurry to produce an 80:15:5 composite coating of the active:carbon black: PVDF on an Al foil current collector. The loading was about 5-7 mg/cm$^3$. The C rate was based on a capacity of 146 mAh g$^{-1}$ for $LiNi_{0.5}Mn_{1.5}O_4$. Coin cells (Al clad (available from Hohsen Corp., Tokyo, Japan)) were fabricated using an electrolyte 1 M $LiPF_6$ dissolved in EC:EMC 1:1 (weight ratio) and 2% tris (trimethylsilyl) phosphate, an electrolyte stabilizing additive for use at high voltage.

Composition

The following compositions $Li_{1.25}Cr_{0.25}Ti_{1.5}O_4$ and $Li_{1.25}Al_{0.25}Ti_{1.5}O_4$ are spinel structured and were studied as solid-state electrolytes. As a potential positive electrode, the following compositions was studied: $Li_{1.075}Cr_{0.075}Ni_{0.35}Mn_{1.5}O_4$, which can be conceptually thought of as a composite of the electrolyte and cathode components, 0.3 [$Li_{1.25}Cr_{0.25}Mn_{1.5}O_4$] 0.7 [$LiNi_{0.5}Mn_{1.5}O_4$], respectively but it is in fact a single-phase, solid solution not a composite.

There are no solid-electrolyte-solid cathode interfaces which is a major shortcoming of the conventional, prior art approaches to solid-state batteries based on a composite of two differing structures such as $Li_7La_3Zr_2O_{12}$ sintered with $LiCoO_2$. Further, LBO from 0-3 wt. % can be added to improve density, grain boundary and bulk ionic conductivity and electronic conductivity.

X-Ray Diffraction (XRD)

Figure 2:
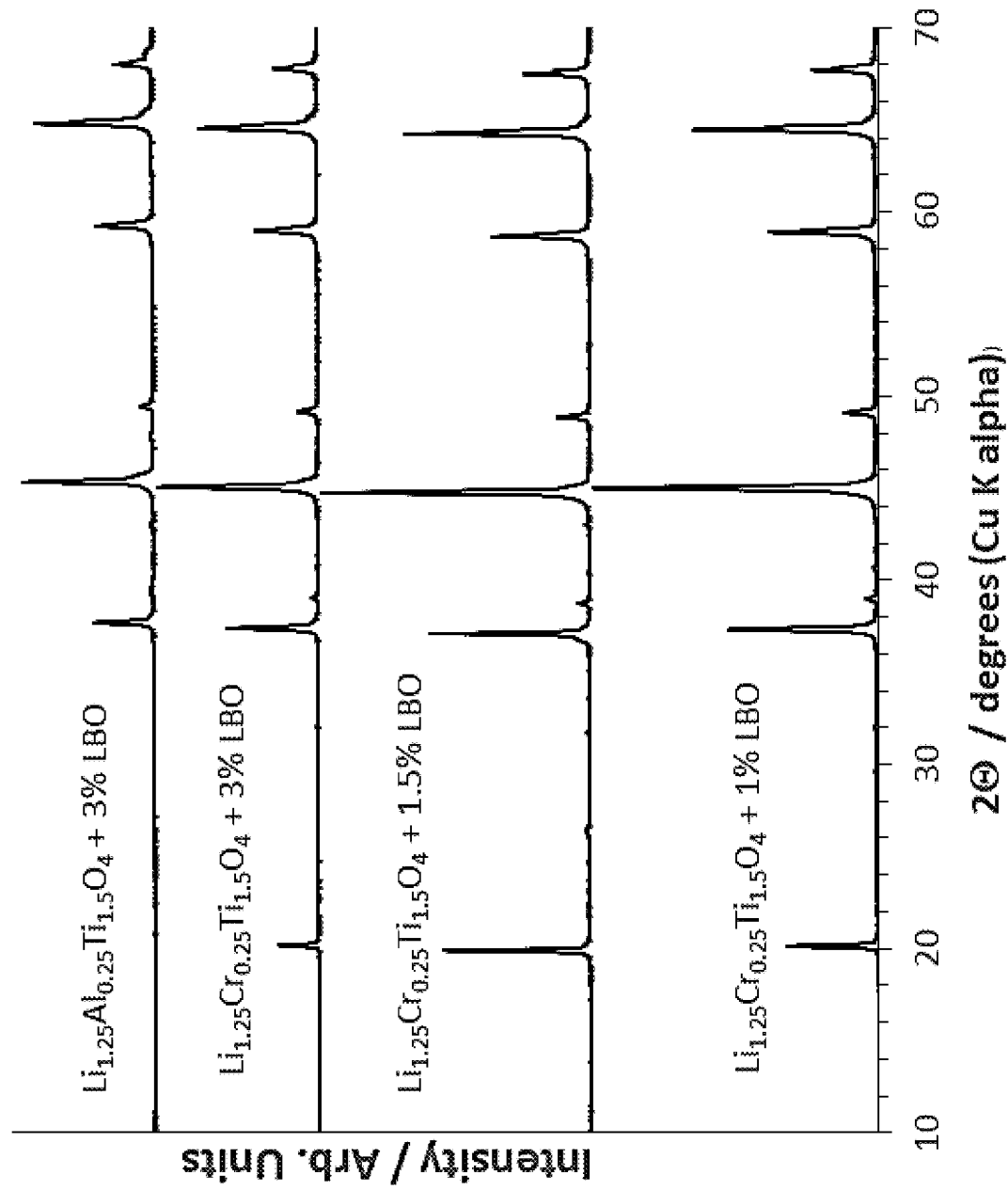
FIG. 2 is XRD plot of hot-pressed samples of $Li_{1.25}Cr_{0.25}Ti_{1.5}O_4$ solid electrolyte powder with increasing amounts of $Li_3BO_3$ (LBO) (three bottom patterns) and $Li_{1.25}Al_{0.25}Ti_{1.5}O_4$ with 3 wt % LBO, according to an embodiment herein.

FIG. 1 shows the XRD patterns of the $Li_{1.25}Cr_{0.25}Ti_{1.5}O_4$ (bottom) and $Li_{1.25}Al_{0.25}Ti_{1.5}O_4$ (top) powders. The sample patterns are indexed to the cubic spinel structure, space group, Fd-3m. The lattice parameters are 8.3439(1) Å and 8.3573(1) Å for $Li_{1.25}Cr_{0.25}Ti_{1.5}O_4$ (LCTO) and $Li_{1.25}Al_{0.25}Ti_{1.5}O_4$ (LATO), respectively. Since $Cr^{3+}$ is larger than $Al^{3+}$, 0.615 Å vs. 0.535 Å the fact that the until cell of LATO is larger than LCTO is unexpected and may suggest a small amount of $Al^{3+}$ mixing onto the tetrahedral 8a spinel site in exchange for 1 $Li^+$ (0.76 Å) on the 16d octahedral site in the Fd-3m space group. Site mixing is highly unlikely for $Cr^{3+}$ owing to its well-known strong crystal field stabilization energy for octahedral coordination. Neutron diffraction will be needed to fully determine site occupancy. XRD patterns of hot-pressed and LBO containing samples are shown in FIG. 2 indicating no new peaks and retention of the spinel structure. In the hot-pressed pellet's XRD patterns versus the powder patterns, there are changes in the relative intensities of the reflections which are attributed to misalignment of the pellet in the XRD beam and/or texturing effects leading to a preferred orientation and a systematic shift in the 2-theta positions to a lower angle attributable to sample displacement in the XRD beam which results from the finite thickness of the pellets.

Conductivity

Figure 3:
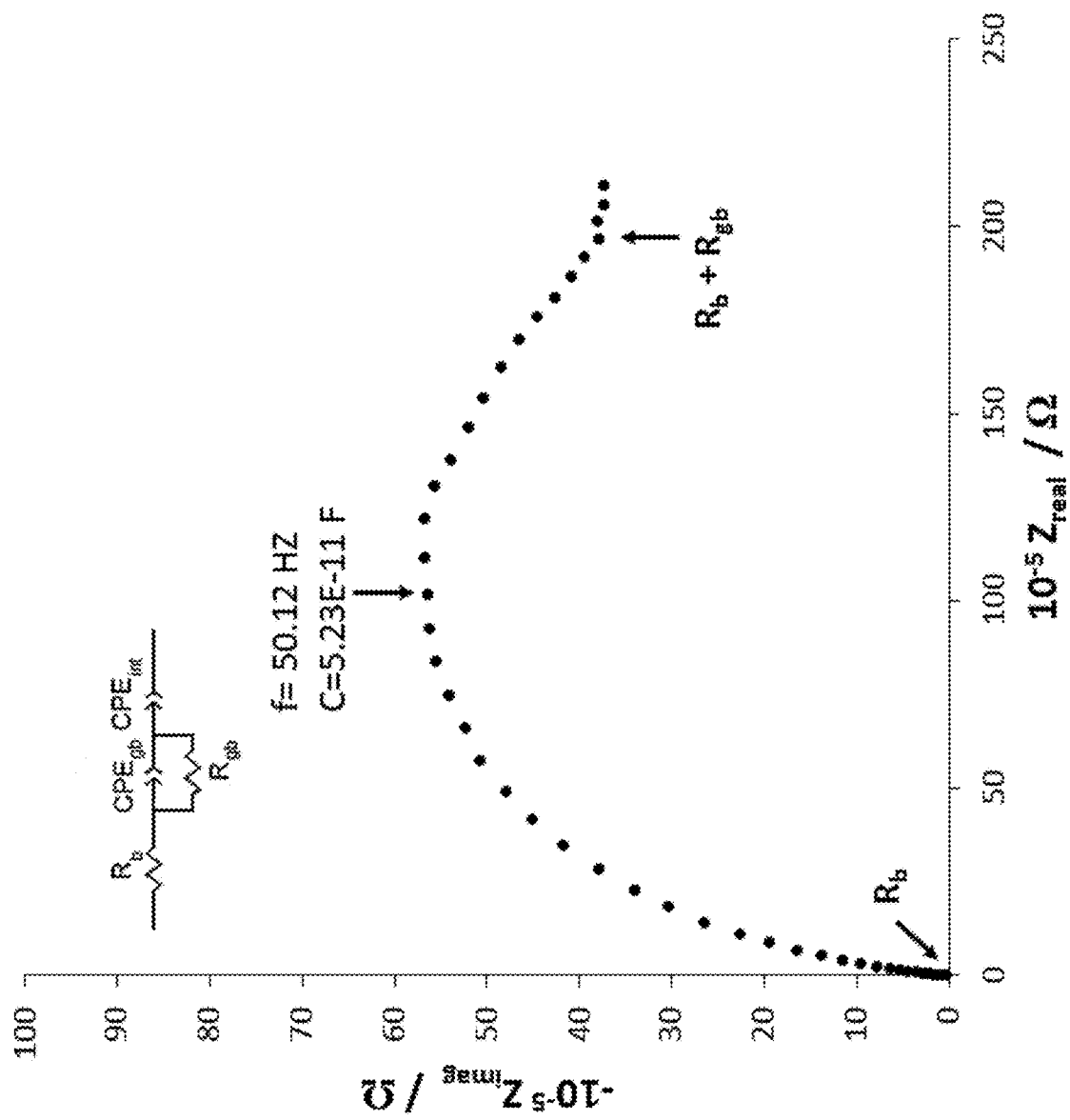
FIG. 3 is a room temperature impedance plot of hot-pressed $Li_{1.25}Cr_{0.25}Ti_{1.5}O_4$ recorded at 298 K and the equivalent circuit used to interpret the data, according to an embodiment herein.

FIG. 3 illustrates the room temperature impedance plot for hot-pressed $Li_{1.25}Cr_{0.25}Ti_{1.5}O_4$ (~94% relative density) and the equivalent circuit (inset) which reasonably models the data. In the equivalent circuit, R refers to resistance, CPE to constant phase element. The impedance spectra show a single semi-circle at higher frequency and the beginning of a straight line at a slope of approximately 45° at lower frequency. The equivalent circuit for this system where only ionic conduction is observed includes $R_B$, bulk or intra-grain impedance, $R_{GB}$, the grain boundary or inter-grain impedance, $CPE_{GB}$, the grain boundary constant phase element and $CPE_{int}$, the sample electrode interface or dual layer constant phase element which is physically attributed to charge build-up at the Au electrode. The geometric capacitance, $C_{geom}$, is not significant in the frequency range investigated and is not included in the equivalent circuit. Since Au Li-ion blocking electrodes are experimentally used, the shape of the curve represents a material which is predominantly a Li-ion conductor with very low electronic conductivity. From FIG. 3, several important points are noted. First, the calculated value of the capacitance using the frequency at the maximum point of the semi-circle is shown on FIG. 3. This capacitance, 5×10$^{-11}$ F, was calculated from $C_{GB}=(2\pi fR)^{-1}$, using f=1.58×10$^2$ Hz and R (diameter of the semi-circle)=1.92×10$^7$Ω. Second, this capacitance value is characteristic of a grain boundary confirming the assignment of this semi-circle to a grain boundary phenomenon. With this interpretation validated, the bulk impedance value, $R_B$ can be taken from the Zreal intercept at the high frequency of the semi-circle and the total impedance, $R_{total}=R_B+R_{GB}$, is taken from the $Z_{real}$ low frequency intercept. Third, the values of $R_B$ and $R_{GB}$ and the physical dimensions of the sample are then used to determine the bulk and grain boundary Li-ion conductivity. The bulk conductivity of the $Li_{1.25}Cr_{0.25}Ti_{1.5}O_4$ pellet at room temperature is 1.63×10$^{-4}$ S cm$^{-1}$ and the total conductivity of $Li_{1.25}Cr_{0.25}Ti_{1.5}O_4$ is 2.84×10$^{-8}$ S cm$^{-1}$. This is in the range of Al substituted $Li_7La_3Zr_2O_{12}$ garnet solid-state electrolyte reported in the industry.

The electronic conductivity of $Li_{1.25}Cr_{0.25}Ti_{1.5}O_4$ at room temperature obtained from the steady state current found through DC polarization is about 1.84×10$^{-8}$ S cm$^{-1}$. Thus, the ionic transport number, tionic, for Li-ions in $Li_{1.25}Cr_{0.25}Ti_{1.5}O_4$, [$t_{ionic}=\sigma_{ionic}/\sigma_{total}$, where $\sigma_{total}=\sigma_{ionic}++\sigma_{electronic}$; $\sigma_{ionic}$ is the total ionic conductivity is about 1, confirming that $Li_{1.25}Cr_{0.25}Ti_{1.5}O_4$ is an ionic conductor. Similarly, $Li_{1.25}Al_{0.25}Ti_{1.5}O_4$ was prepared, densified through hot-pressing (~97%) and analyzed. The bulk ionic and total ionic conductivities of $Li_{1.25}Al_{0.25}Ti_{1.5}O_4$ are $5.11\times10^{-5}$ and $2.85\times10^{-7}$ S cm$^1$, respectively. The slightly lower conductivity of LATO relative to LCTO might be a result of site mixing of Al onto the tetrahedral 8a Li site which would put it directly in the path of the 8a→16c→8a Li$^+$ ion conduction route. Indeed, in an industry study of complex spinels, the only sample having significant ionic conductivity $LiNi_{0.5}Ge_{1.5}O_4$ was the only sample in the study with only Li occupying the 8a site.

Figure 4:
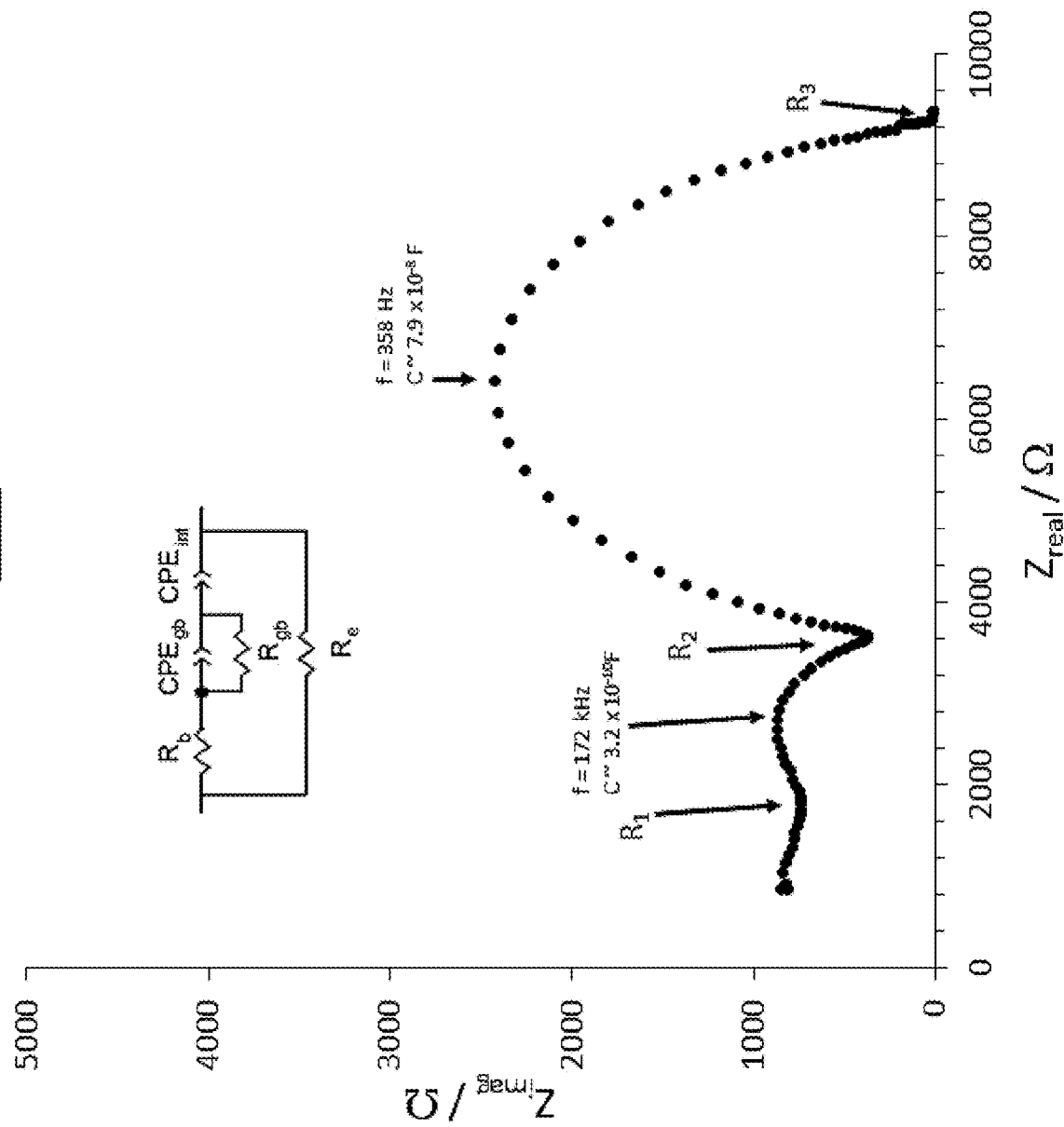
FIG. 4 is a room temperature impedance plot of hot-pressed $Li_{1.25}Cr_{0.25}Ti_{1.5}O_4/3\%$ LBO recorded at 300K and the equivalent circuit used to interpret the data where $R_1=R_eR_b/(R_e+R_b)$, $R_2=R_e(R_b+R_{gb})/(R_e+R_b+R_{gb})$, and $R_3=R_e$, according to an embodiment herein.
Figure 5A:
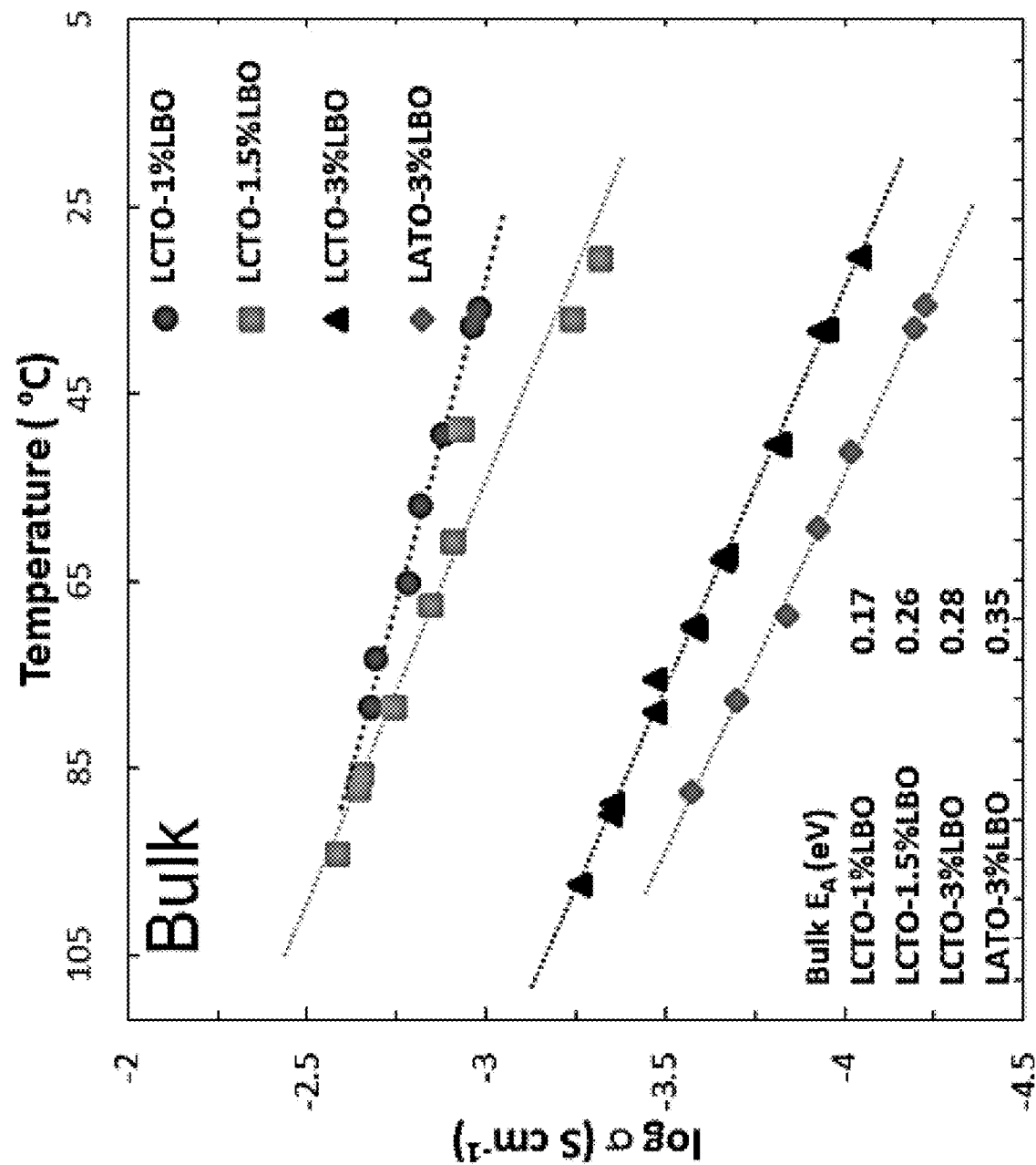
FIGS. 5A through 5D are graphs illustrating bulk ionic, grain boundary ionic, total ionic, and electronic conductivities of $Li_{1.25}CrTi_{1.5}O_4$ (LCTO) and $Li_{1.25}Al_{0.25}Ti_{1.5}O_4$ (LATO) with varied weight percent $Li_3BO_3$ (LBO) as a function of temperature, whereby EA is the activation energy, according to an embodiment herein.
Figure 5B:
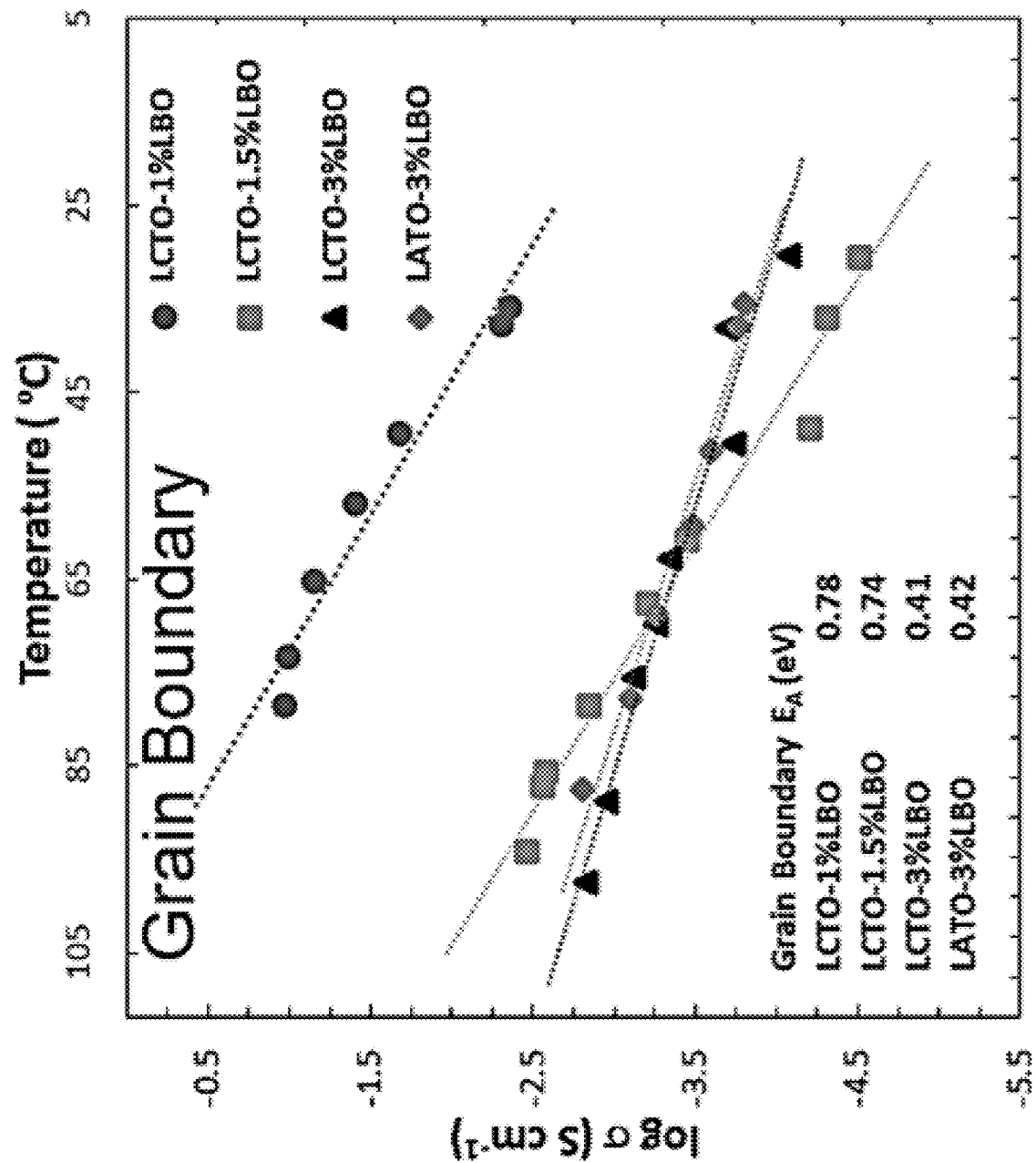
Figure 5C:
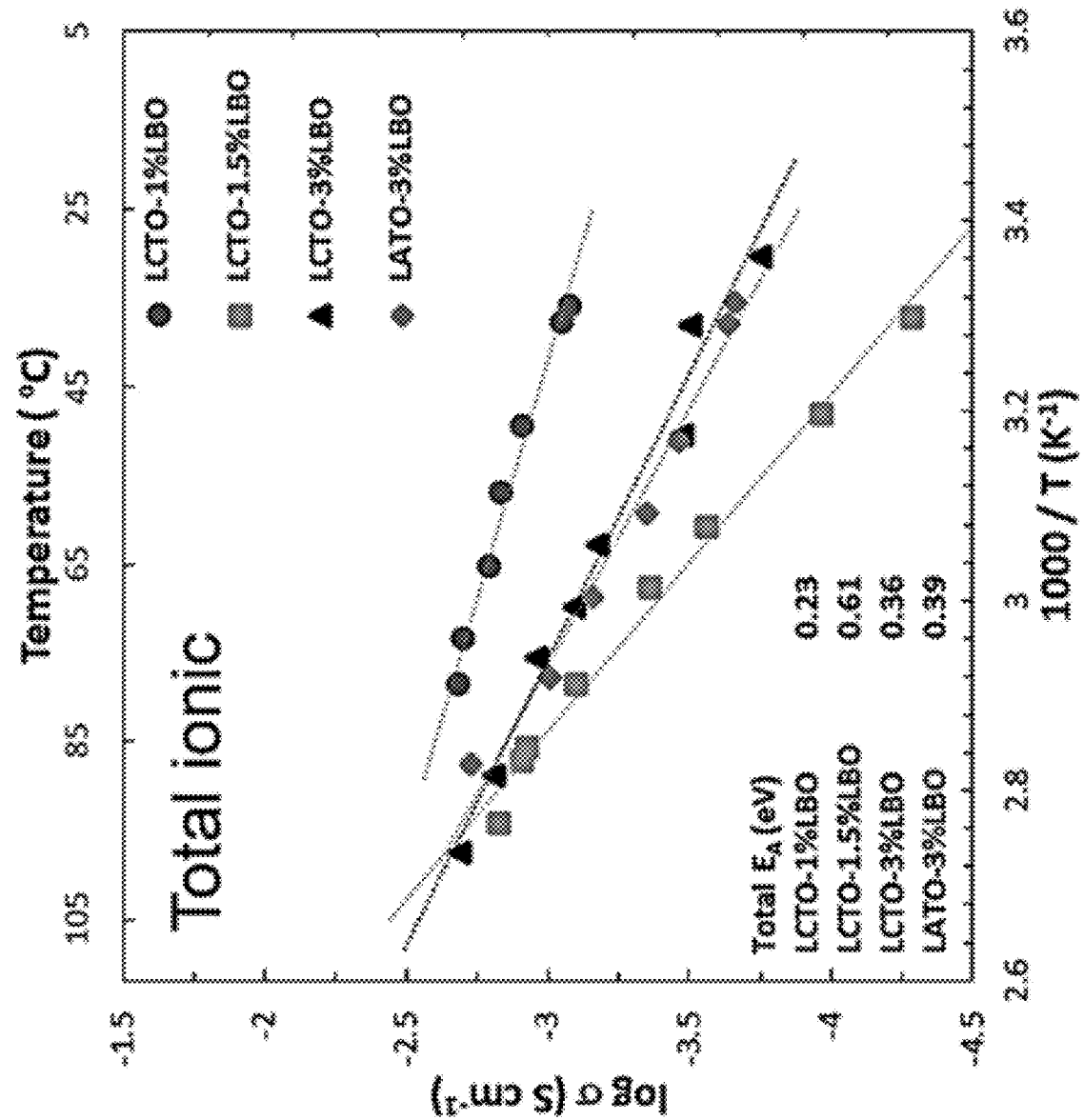
Figure 5D:
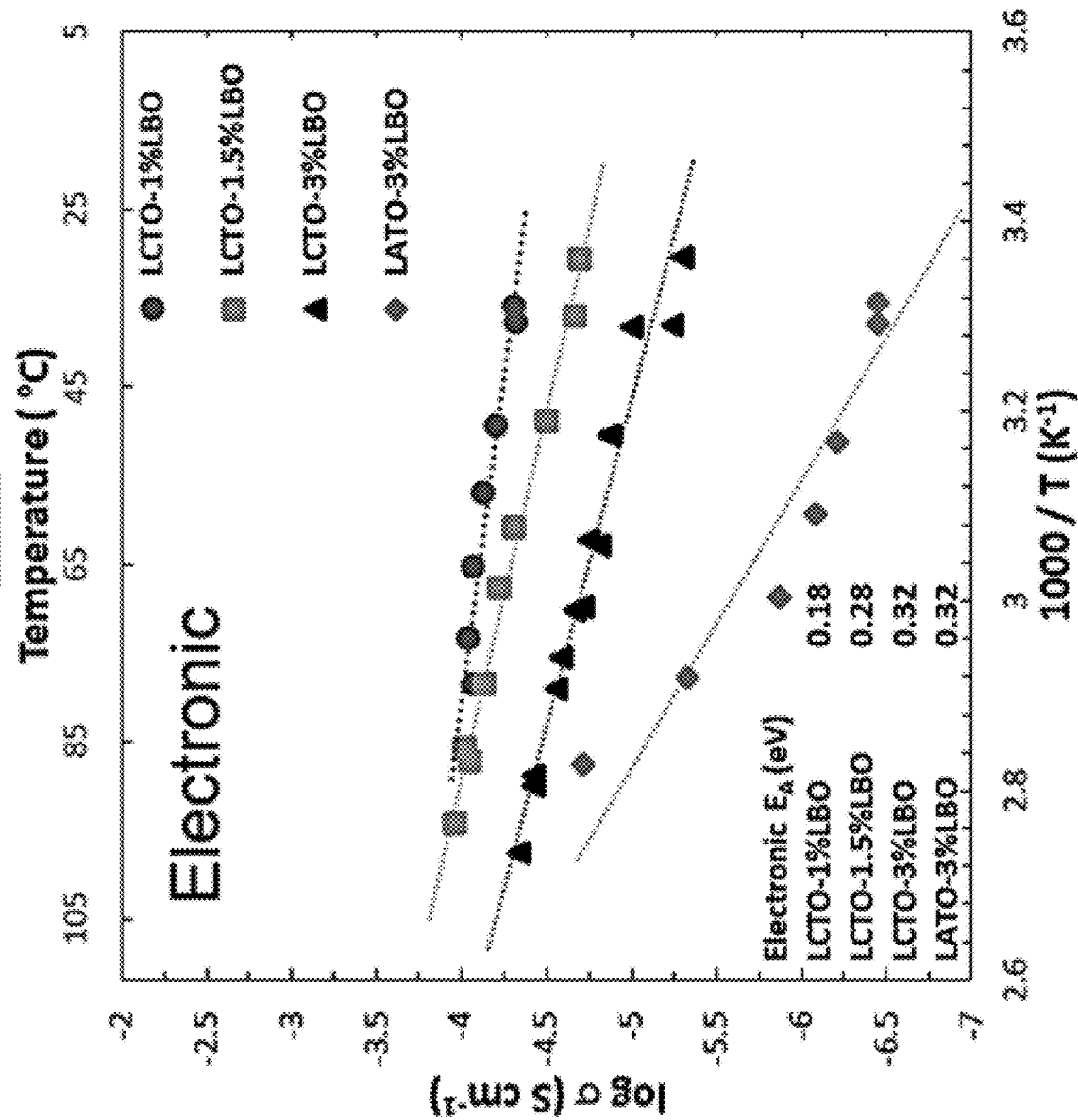

FIG. 4 shows the room temperature impedance plot of $Li_{1.25}Cr_{0.25}Ti_{1.5}O_4$ hot-pressed with 3 wt % LBO to form a pellet of 98% relative density and the equivalent circuit (inset) which reasonably models the data. FIG. 4 will be used to illustrate the interpretation of the EIS data for all of the LBO containing samples. From FIG. 4, several points can be made. First, the capacitance is calculated as previously described in the discussion of FIG. 3, above, for the first two semi-circles from higher (right) to lower frequency and the values are noted on FIG. 4. The calculated capacitances are characteristic of grain boundary and bulk phenomena for the higher frequency and lower frequency semicircles, respectively. Second, the shape of the impedance plot is characteristic of an ionic conductor with partial electronic conductance, in agreement with the observation that hot-pressing with the LBO sintering aid changed the color of the samples to a black color. Modelling the transport, therefore, requires the addition of a parallel electronic resistance, $R_e$, to the, ionic-conduction circuit. The values of the resistances in the equivalent circuit, bulk ionic resistance ($R_b$), grain boundary ionic resistance ($R_{gb}$), and electronic resistance ($R_e$) can be determined from the intercepts, $R_1$, $R_2$, and $R_3$, respectively based on the following relationships $R_1=R_eR_b/(R_e+R_b)$, $R_2=R_e(R_b+R_{gb})/(R_e+R_b+R_{gb})$, and $R_3=R_e$. Finally, the values of $R_b$, $R_{gb}$, and $R_e$ and the physical dimensions of the sample are then used to determine the bulk Li-ion, grain boundary Li-ion and electronic conductivities, respectively.

For the LBO containing samples, two pellets were analyzed for each composition. The highest ionic conductivity was found for the $Li_{1.25}Cr_{0.25}Ti_{1.5}O_4$/1 wt. % LBO composition. At room temperature its bulk conductivity ranges from $3.34\times10^{-4}$ S cm$^{-1}$ to $1.03\times10^{-3}$ S cm$^{-1}$ and the grain boundary ionic conductivity ranges from $1.53\times10^{-4}$ S cm$^{-1}$ to $4.36\times10^{-3}$ S cm$^{-1}$ from two measurements taken. As a further confirmation of the high conductivity, a measurement of the total ionic conductivity was performed again. A total room temperature ionic conductivity of $6.01\times10^{-4}$ S cm$^{-1}$ was obtained versus $7.29\times10^{-4}$ S cm$^{-1}$ initially for the same sample. The room temperature maximum total Li$^+$ ion conductivity measured for a pellet of $Li_{1.25}Cr_{0.25}Ti_{1.5}O_4$-1 wt. % LBO, $7.29\times10^{-4}$ S cm$^{-1}$, is near the range of the highest ever reported for an oxide in industry. By comparison, substituted cubic garnet $Li_7La_3Zr_2O_{12}$ has reported total Li-ion conductivity ranging from $5\times10^{-4}$ to $1\times10^{-3}$ S cm$^{-1}$. The electronic conductivity of $Li_{1.25}Cr_{0.25}Ti_{1.5}O_4$/1 wt. % LBO ranged from $4.9\times10^{-5}$ to $7.11\times10^{-4}$ S cm$^{-1}$ which means this composition may have applicability as an anolyte or catholyte where mixed electronic and ionic conductivity is important.

With the addition of LBO, density increased, bulk ionic conductivity was slightly increased, grain boundary conductivity was increased by three orders of magnitude from ~$10^{-7}$ to ~$10^{-4}$ S cm$^{-1}$ and electronic conductivity was increased by four orders of magnitude from $10^{-8}$ S cm$^{-1}$ to $10^{-4}$ S cm$^{-1}$. Thus, use of LBO might be particularly attractive to increase electronic conductivity as a catholyte or anolyte. Data for all samples are shown in Table 1.

TABLE 1

Room temperature (298K) bulk ionic, $\sigma_{bulk}$, grain boundary ionic, $\sigma_{gb}$, electronic conductivity, $\sigma_{elec}$, total ionic conductivity, $\sigma_{ion}$, and relative density, D, of $Li_{1.25}CrTi_{1.5}O_4$ (LCTO) and $Li_{1.25}Al_{0.25}Ti_{1.5}O_4$ (LATO) solid electrolytes with and without $Li_3BO_3$ (LBO) sintering aid.

| Sample | $\sigma_{bulk}$/S cm$^{-1}$ | $\sigma_{gb}$/S cm$^{-1}$ | $\sigma_{ion}$/S cm$^{-1}$ | $\sigma_{elec}$/S cm$^{-1}$ | D/% |
|---|---|---|---|---|---|
| LCTO | $1.63\times10^{-4}$ | $1.19\times10^{-7}$ | $1.19\times10^{-7}$ | $1.84\times10^{-8}$ | 94 |
| LATO | $5.11\times10^{-5}$ | $4.11\times10^{-7}$ | $4.08\times10^{-7}$ | $9.79\times10^{-8}$ | 97 |
| LCTO/1% LBO-1 | $3.34\times10^{-4}$ | $1.53\times10^{-4}$ | $1.05\times10^{-4}$ | $7.11\times10^{-4}$ | 98 |
| LCTO/1% LBO-2 | $1.02\times10^{-3}$ | $2.56\times10^{-3}$ | $7.29\times10^{-4}$ | $4.10\times10^{-5}$ | 98 |
| LCTO/1.5% LBO-1 | $2.30\times10^{-4}$ | $1.76\times10^{-4}$ | $9.97\times10^{-5}$ | $3.36\times10^{-4}$ | 95 |
| LCTO/1.5% LBO-2 | $5.72\times10^{-4}$ | $3.08\times10^{-5}$ | $2.92\times10^{-5}$ | $2.07\times10^{-5}$ | 95 |
| LCTO/3% LBO-1 | $8.17\times10^{-5}$ | $1.79\times10^{-4}$ | $5.61\times10^{-5}$ | $7.50\times10^{-5}$ | 96 |
| LCTO/3% LBO-2 | $9.32\times10^{-5}$ | $1.09\times10^{-4}$ | $5.02\times10^{-5}$ | $6.19\times10^{-6}$ | 96 |
| LATO/3% LBO-1 | $5.11\times10^{-5}$ | $1.14\times10^{-6}$ | $1.12\times10^{-6}$ | $9.79\times10^{-8}$ | 97 |
| LATO/3% LBO-2 | $4.89\times10^{-5}$ | $1.16\times10^{-4}$ | $3.44\times10^{-5}$ | $1.43\times10^{-7}$ | 99 |

Bulk ionic, grain boundary ionic, total ionic and electronic conductivities of $Li_{1.25}Cr_{0.25}Ti_{1.5}O_4$ (LCTO) and $Li_{1.25}Al_{0.25}Ti_{1.5}O_4$ (LATO) with varied weight percent LBO are shown in FIGS. 5A through 5D as a function of temperature. In FIGS. 5A through 5D, log a is plotted as a function of 1/T in order to ease the reading of the conductivity values, however, all values of the activation energies EA were calculated based on log ($\sigma$T) plotted as a function of 1/T, where a is the conductivity (S cm$^{-1}$) and T is the temperature (K). From FIGS. 5A through 5D, several points can be made. First, all samples show fast room temperature Li-ion conductivity ranging from ~$10^{-4}$ to ~$10^{-3}$ S cm$^{-1}$ and comparable electronic conductivity suggesting applicability as mixed ionic electronic conductors and the LCTO-1% LBO composition stands out for its high conductivity. Use of these materials as solid electrolytes will require the discovery of an alternate sintering aid or an alternate densification process to increase density and reduce grain boundary impedance perhaps under oxygen in order to maintain low electronic conductivity.

Second, turning attention to the bulk ionic conductivity activation energies, the values range from 0.18, 0.28, 0.32 and 0.32, respectively for LCTO-1% LBO, LCTO-1.5% LBO, LCTO-3% LBO and LATO-3% LBO, respectively. The bulk activation energies are close to what is reported in industry for other fast Li-ion conductors indicating fast Li-ion mobility. The especially low bulk activation energy of LCTO-1% helps to explain the very high Li-ion conductivity of this composition. These bulk activation energies can be compared to an activation energy of 0.35 eV reported in industry from Li NMR line broadening experiments on spinel-structured, Li-doped $MgAl_2O_4$.

Third, the grain boundary ionic conductivity activation energies range from 0.78, 0.74, 0.41 and 0.42 eV for LCTO-1% LBO, LCTO-1.5% LBO, LCTO-3% LBO and LATO-3% LBO, respectively suggesting that the addition of a higher concentration of LBO has a strong effect to lower the activation energy for ionic conductivity at the grain boundary. Fourth, looking at the total ionic conductivities shows a clear superior performance for the LCTO-1% LBO sample, its total conductivity predominantly controlled by its higher bulk ionic mobility despite higher activation energy at its grain boundaries. The total ionic conductivity activation energies range from 0.23, 0.61, 0.36, 0.39 eV for LCTO-1% LBO, LCTO-1.5% LBO, LCTO-3% LBO and LATO-3% LBO, respectively. The addition of excess LBO, >1%, negatively affects the total Li-ion conductivity although at 3% LBO the grain boundary ionic activation energy is considerably lower. The LCTO-1.5% LBO sample appears to be an outlier as one would expect it to fall between the 1% and the 3% LBO samples. The electronic conductivities activation energies range from 0.18, 0.28, 0.32, and 0.32 eV, for LCTO-1% LBO, LCTO-1.5% LBO, LCTO-3% LBO and LATO-3% LBO, respectively. It is observed that at a low level of LBO the electronic conductivity is highest and as more LBO is added the electronic conductivity decreases. Overall, it appears that 1% LBO has the maximum electronic and ionic conductivity. It might be that the higher electronic conductivity improves the ionic conductivity owing to an enhancement effect of the transport of two species. As a Li-ion hops, the framework must locally adjust its electronic charge to achieve electroneutrality slowing somewhat the ionic movement. This drag on ionic conductivity might be reduced by the presence of electronic conductivity which would allow rapid achievement of electroneutrality within the framework.

Figure 6:
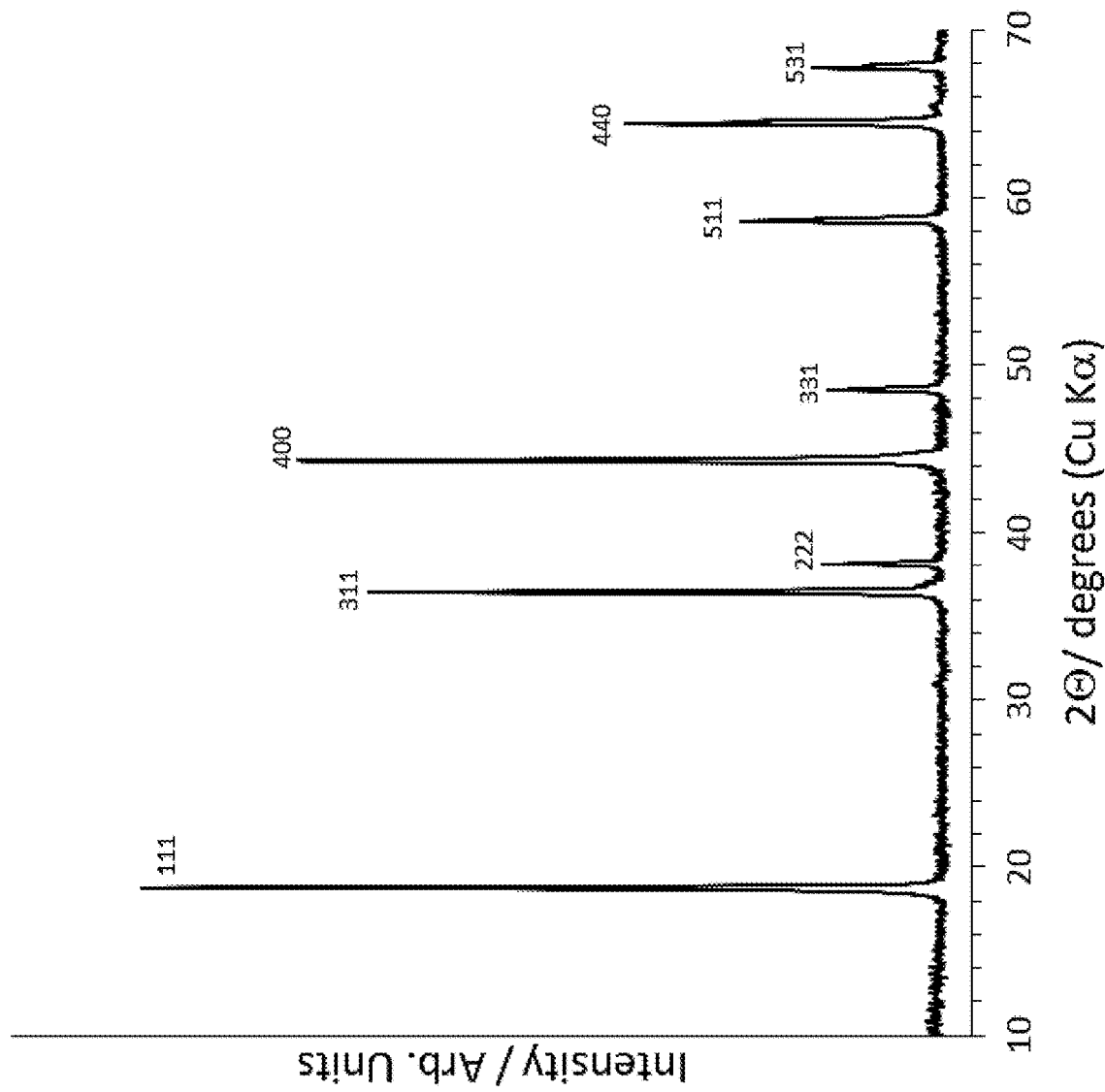
FIG. 6 is a XRD pattern of 30% $Li_{1.25}Cr_{0.25}Mn_{1.5}O_4$ and 70% $LiNi_{0.5}Mn_{1.5}O_4$ solid solution formed at 850° C. (nominal composition: $Li_{1.025}Cr_{0.025}Ni_{0.45}Mn_{1.5}O_4$), whereby the XRD peaks are indexed to the Fd-3m spinel structure, according to an embodiment herein.
Figure 7:
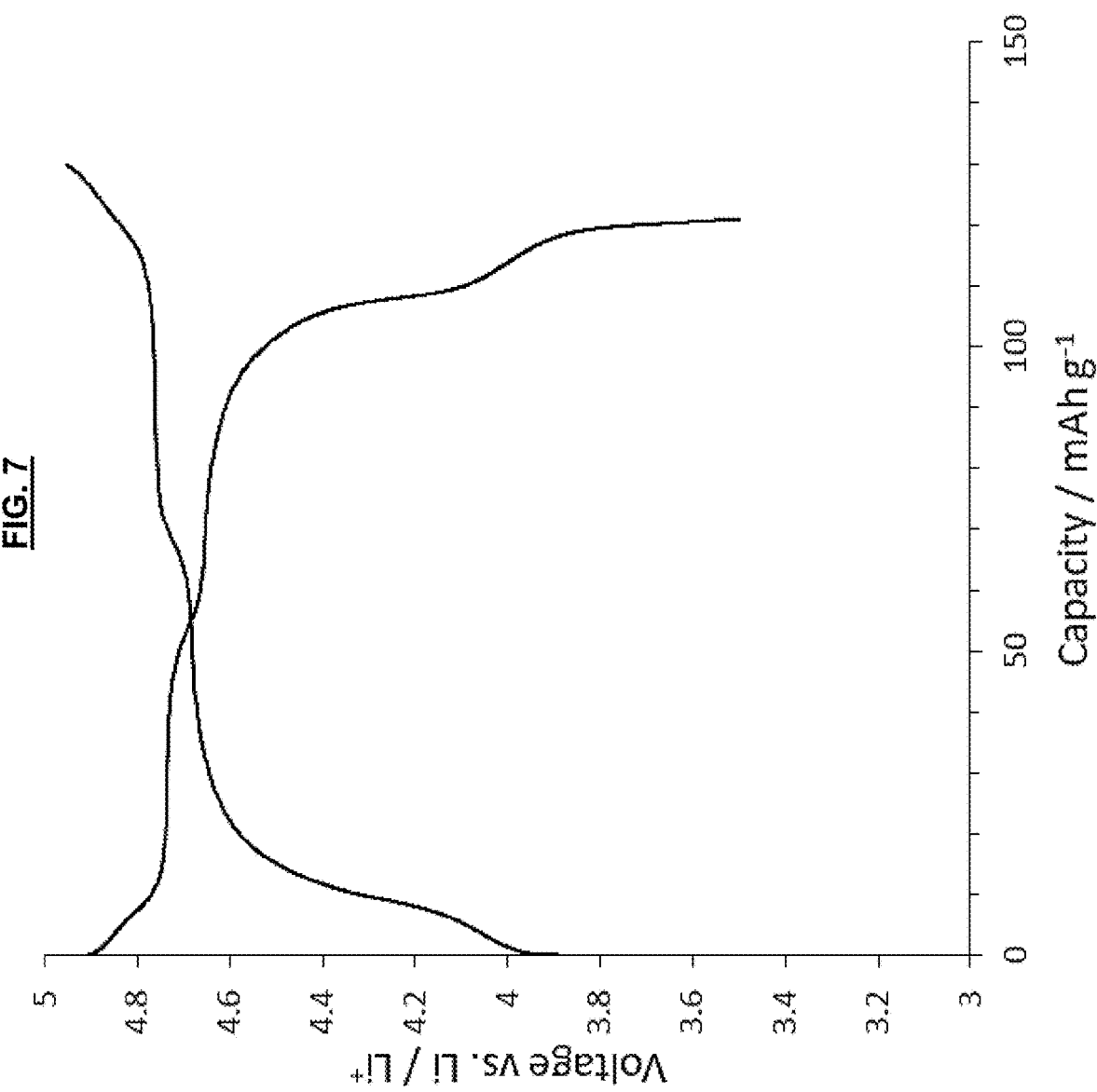
FIG. 7 is an electrochemical charge and discharge curve of 30% $Li_{1.25}Cr_{0.25}Mn_{1.5}O_4$ and 70% $LiNi_{0.5}Mn_{1.5}O_4$ solid solution formed at 850° C. (nominal composition: $Li_{1.025}Cr_{0.025}Ni_{0.45}Mn_{1.5}O_4$), according to an embodiment herein.
Figure 8:
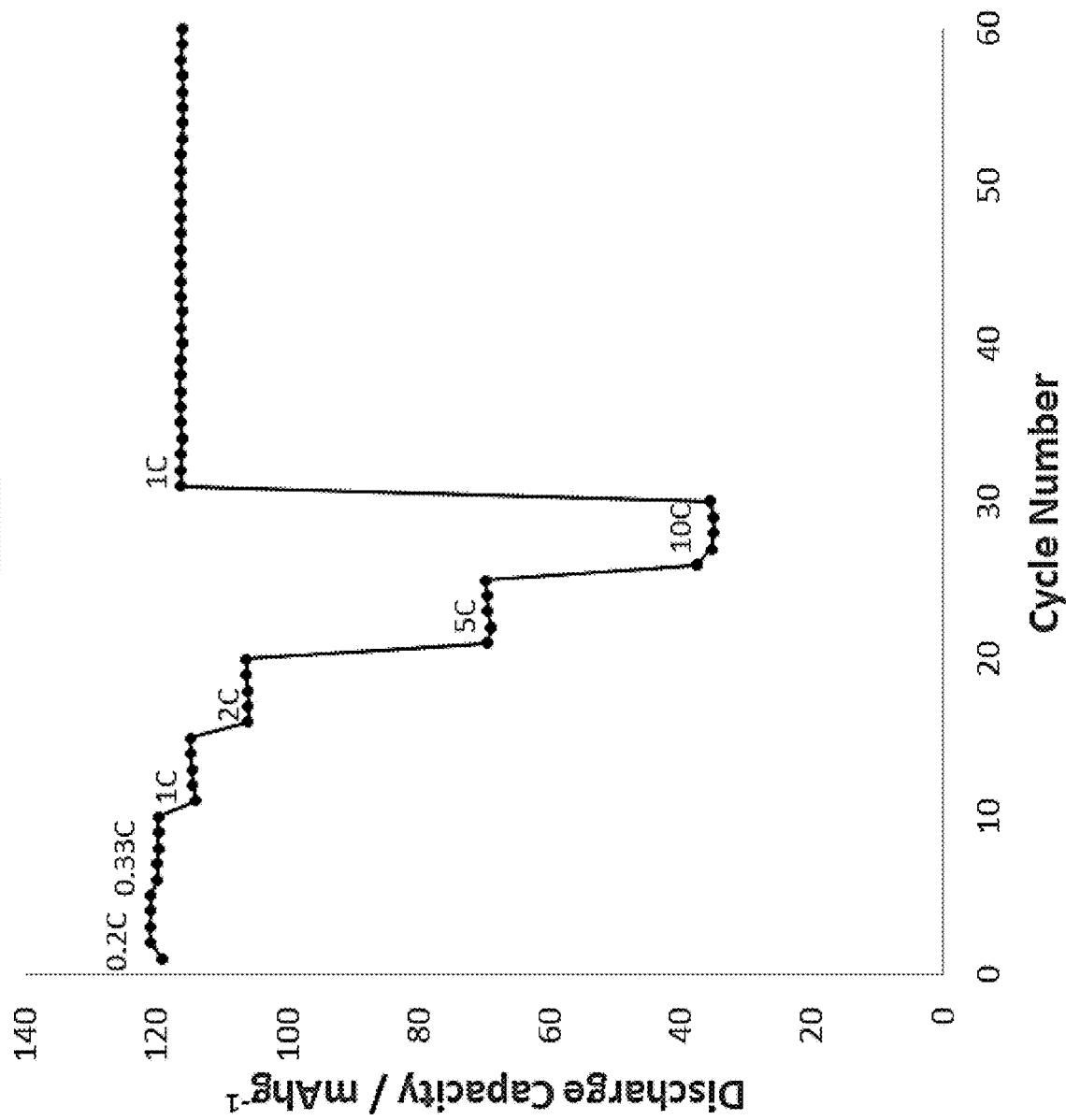
FIG. 8 is a graph illustrating the discharge capacity of $Li_{1.075}Cr_{0.075}Ni_{0.35}Mn_{1.5}O_4$ as a function of the charge and discharge rate, whereby the charge and discharge rate are varied for each of five cycles (cycles 1-30) and fixed at 1 C for cycles 31-60, according to an embodiment herein.

Electrochemical Properties of Solid Solutions of $LiNi_{0.5}Mn_{1.5}O_4$ and $Li_{1.25}Cr_{0.25}Mn_{1.5}O_4$ To study the performance as cathode, Mn was substituted for Ti in the solid electrolyte component owing to the known deleterious effect of significant Ti substitution for Mn in $LiNi_{0.5}Mn_{1.5}O_4$. The XRD pattern of nominal composition 0.3 $[Li_{1.25}Cr_{0.25}Mn_{1.5}O_4]$ 0.7$[LiNi_{0.5}Mn_{1.5}O_4]$, i.e., $Li_{1.075}Cr_{0.075}Ni_{0.35}Mn_{1.5}O_4$ composition is shown in FIG. 6. The lattice constant was determined to be 8.1704(1) Å, which is comparable to $LiNi_{0.5}Mn_{1.5}O_4$ (8.1785 Å) the predominant component of the solid solution. The slight decrease in the lattice constant is to be expected based on the slightly smaller average size of $Li^+$, $Cr^{3+}$ (0.76 Å, 0.615 Å, averaging 0.6875 Å) compared to $Ni^{2+}$ (0.69 Å) in octahedral coordination. The pattern is indexed to the cubic spinel structure, space group, Fd-3m, indicating a single-phase composition of spinel structure. The electrochemical discharge curve at 0.2 C charge and discharge rate of the nominal composition 0.3 $[Li_{1.25}Cr_{0.25}Mn_{1.5}O_4]$ 0.7 $[LiNi_{0.5}Mn_{1.5}O_4]$, i.e., $Li_{1.075}Cr_{0.075}Ni_{0.35}Mn_{1.5}O_4$ composition is shown in FIG. 7. A discharge capacity ~120 mAh $g^{-1}$ is observed. Assuming, electrochemical activity based on $Ni^{2+}/Ni^{3+}$, $Ni^{3+}/Ni^{24}$ and $Cr^{3+}/Cr^{4+}$ couples yield a theoretical capacity of about 116 mAh $g^{-1}$ for $Li_{1.075}Cr_{0.075}Ni_{0.35}Mn_{1.5}O_4$. The majority of the discharge capacity is observed at >4.6 V. Additional capacity, beyond the theoretical, can be attributed to the $Mn^{3+}/Mn^{4+}$ couple observed as a shoulder around 4 V. The excellent rate performance attributable to good $Li^+$ ionic conductivity is shown in FIG. 8. The charge and discharge rates are varied from 0.2 C to 10 C, with the charge and discharge rates remaining equal for each individual cycle. Additionally, the material shows excellent cycle life and no damage from the high rate of charge and discharge is evidenced as the capacity returns to 120 mAh $g^{-1}$ for 1 C after charging and discharging at 10 C rate.

Results

The introduction of Li on multiple sites has been a successful strategy to attain higher $Li^+$ ion conductivity. As an example, in garnet structured $Li_7La_3Zr_2O_{12}$ the highest known oxide-based $Li^+$ conductor ($10^{-3}$ to $10^{-4}$ S $cm^{-1}$ at room temperature) $Li^+$ is sited on both tetrahedral (24d) and octahedral (96h) sites and the occupancy ratio between the sites is critical to optimization of the conductivity. By comparison, $LiNi_{0.5}Ge_{1.5}O_4$ of modest $Li^+$ conductivity ($10^{-8}$ S $cm^{-1}$ at 63° C.) has Li only on the tetrahedral 8c site and Ni and Ge ordered 1:3 over the 4b and 12d octahedral sites of the ordered $P_43 2$ spinel. The approach taken to obtain Li on both tetrahedral 8a and octahedral 16d sites within the Fd-3m structured spinel is to prepare family members of composition comprising $Li_{1+x+z}M(II)_{0.5-2x-z}M(III)_{x+y}M(IV)_{1.5-2y-z}M(V)_yM(V)_zO_4$, wherein M(II) comprises any of Mg, Co, Ni, Cu, and Zn, wherein M(III) comprises any of Al, Cr, Fe, Ga, and In, wherein M(IV) comprises any of Ti, Mn, and Ge, wherein M(V) comprises any of Nb, Ta, Sb, and Bi, and wherein $0 \le x \le 0.25$, $0 \le y \le 0.75$, $0 \le z \le 0.5$, and (x+z)>0. This approach puts $Li^+$ on both tetrahedral and octahedral sites, enhancing its mobility.

Integration of solid electrolytes into electrodes has been problematic thus far in the industry. Density functional theory (DFT) computational studies have shown reactivity of cubic garnet structured $Li_7La_3Zr_2O_7$ and common Li-ion cathode materials and experimental studies have shown the reactivity of $LiNi_{0.5}Mn_{1.5}O_4$ cathode with LLZO during electrochemical cycling. Furthermore, $LiCoO_2$ forms unfavorable interfaces during densification and requires a $LiNbO_3$ coating to prevent reactivity. Solid solutions of $Li_{1.25}(Al,Cr)_{0.25}(Ti,Mn)_{1.5}O_4$ with known electrode materials such as $LiNi_{0.5}Mn_{1.5}O_4$, e.g., $x[LiNi_{0.5}Mn_{1.5}O_4]x-1[Li_{1.25}(Al,Cr)_{0.25}(Ti,Mn)_{1.5}O_4]$ (0<x<1) with grain boundary engineering through use of LBO or other sintering aids offer an alternative, simpler route since the solid electrolyte-solid electrode interface is eliminated and the LBO increases the electronic conductivity which is needed for use as an electrode. This should lead to increased power owing to improved Li-ion and electronic conductivity within the electrode and could be used as part of an all solid-state battery with a garnet based separator and Li metal anode or in a fully-spinel structured all-solid battery or used with a spinel, Ti containing electrolyte with an interfacial layer such as $Li_3N$ separating it from a Li metal or carbon anode. The $LiNi_{0.5}Mn_{1.5}O_4$ spinel is particularly attractive for solid-state application owing to its high energy storage density, high voltage (~4.7V) use of abundant chemicals, small lattice change during charge and discharge and high Li diffusivity throughout the range of Li composition.

The synthesis and the fast Li-ion conductivity of the spinel structured $Li_{1.25}(Al$ or $Cr)_{0.25}(Ti$ or $Mn)_{1.5}O_4$ and solid solutions with the $LiNi_{0.5}Mn_{1.5}O_4$ high voltage positive electrode are provided in accordance with the embodiments herein as examples of a large class of fast Li-ion conducting potential electrolytes and cathodes based on the spinel structure. Ionic conductivity equal to that of the garnet structured Al substituted $Li_7La_3Zr_2O_{12}$ is shown. Li is located on both octahedral and tetrahedral sites to form a fast 3D Li$^+$ ion conduction pathway in Li$_{1.25}$(Al,Cr)$_{0.25}$(Ti,Mn)$_{1.5}$O$_4$, potentially enabling the all-solid all-spinel-structured battery concept with Li$_4$Ti$_5$O$_{12}$ spinel structured anode and LiMn$_2$O$_4$ or LiNi$_{0.5}$Mn$_{1.5}$O$_4$ spinel structured cathode. Sintering with LBO leads to a highly dense mixed ionic, electronic conductor which may have application as a catholyte or a coating layer to form an artificial solid electrolyte interface which may reduce reactivity with the electrolyte.

Electrochemical activity has been demonstrated for solid solutions of Li$_{1.25}$Cr$_{0.25}$Mn$_{1.5}$O$_4$ and LiNi$_{0.5}$Mn$_{1.5}$O$_4$ with discharge capacity of near or greater than the theoretical capacity of LiNi$_{0.5}$Mn$_{1.5}$O$_4$ demonstrating the concept of a spinel catholyte and a spinel cathode reacted to form a single-phase solid solution of spinel structure.

Figure 9:
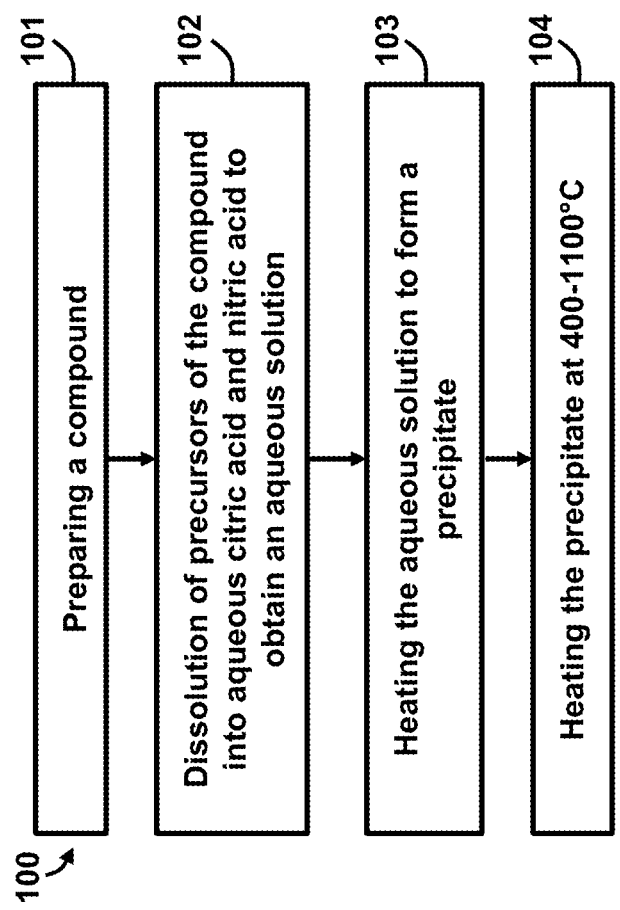
FIG. 9 is a flow diagram illustrating a method, according to an embodiment herein.

FIG. 9 is a flow diagram illustrating a method 100 comprising preparing (101) a compound comprising Li$_{1+x+z}$M(II)$_{0.5-2x-z}$M(Iii)$_{x+y}$M(IV)$_{1.5-2y-z}$M(V)$_y$M(V)$_z$O$_4$, wherein M(II) comprises any of Mg, Co, Ni, Cu, and Zn, wherein M(III) comprises any of Al, Cr, Fe, Ga, and In, wherein M(IV) comprises any of Ti, Mn, and Ge, wherein M(V) comprises any of Nb, Ta, Sb, and Bi, wherein 0≤x≤0.25, 0≤y≤0.75, 0≤z≤0.5, and wherein (x+z)>0; dissolution (102) of precursors of the compound into aqueous citric acid and nitric acid to obtain an aqueous solution; heating (103) the aqueous solution to form a precipitate; and heating (104) the precipitate at 400-1100° C.

The method of forming the composition of spinel structured materials has fast Li-ion conductivity and hence has enhanced utility as materials for solid-state rechargeable lithium batteries. Unlike conventional materials which are used in a composite with a solid electrode, the embodiments herein can form single-phase solid solutions with spinel structured electrodes including LiNi$_{0.5}$Mn$_{1.5}$O$_4$, LiMn$_2$O$_4$, and Li$_4$Ti$_5$O$_{12}$, according to some examples.

The embodiments herein have utility, for example, where safe, high-energy, and high-rate batteries are required in a conformable wearable configuration, for small electronic devices, for unmanned aerial and ground vehicles as well as for electric and hybrid electric propulsion. Solid-state electrolytes offer some safety advantage by replacement of the flammable organic liquid electrolytes in current use. A fully solid-state fully-spinel structured material might have high rate properties allowing fast charge and discharge which may be useful for reducing time needed to charge. Additionally, the embodiments herein may be used for lithium rechargeable batteries. For example, the materials provided by the embodiments herein can have use for personal electronic devices such as laptop computers and cellphones and for hybrid or fully electric propulsion.

The uses for Li-ion batteries, which incorporates the material provided by the embodiments herein, include use in electric and hybrid-electric vehicles and as start-stop in vehicles, as well as power tools such as drills, saws, lawn-mowers, and other yard equipment, and in addition to power unmanned vehicles on the ground and in the air. Moreover, the materials provided by the embodiments herein may be used in Li-ion batteries used for utility scale energy storage to back-up intermittent renewable energy sources such as wind or solar.

Cathode composites with lithium nickel manganese oxides cathodes can be an enabling technology for this cobalt free composition which is highly desired since cobalt is an expensive, limited element. Conventional electrolyte technology does not work at the near 5 V vs. Li voltage that the cathode material provided by the embodiments herein operates.

The embodiments herein can be used as a solid electrolyte or as cathode potentially enabling the all-solid all-spinel-structured battery concept with Li$_4$Ti$_5$O$_{12}$ spinel structured anode and LiMn$_2$O$_4$ or LiNi$_{0.5}$Mn$_{1.5}$O$_4$ spinel structured cathode. For use as a Li-ion separator with graphite or Li anode, a buffer layer such as Li$_3$N can be used to prevent reduction of the solid electrolyte. Sintering with LBO leads to a highly dense mixed ionic, electronic conductor which may have application as a cathode as part of a solid-state battery or as a coating layer to form an artificial solid electrolyte interface which may reduce reactivity with the electrolyte. As described in the experiment above, electrochemical activity has been demonstrated for solid solutions of Li$_{1.25}$Cr$_{0.25}$Mn$_{1.5}$O$_4$ and LiNi$_{0.5}$Mn$_{1.5}$O$_4$ with discharge capacity of near or greater than the theoretical capacity of LiNi$_{0.5}$Mn$_{1.5}$O$_4$ demonstrating the concept of a spinel catholyte and a spinel cathode reacted to form a single-phase solid solution of spinel structure. The embodiments herein overcome the deficiencies of the conventional solutions since the conventional methods for manufacturing a solid-state electrode for a solid-state battery is to sinter or compress an electrolyte phase with the cathode phase. Inevitably, Li-ion conduction is impeded at the interface of the two phases. Conversely, the embodiments herein use a single-phase of spinel structure, which eliminates the interfacial impedance problem intrinsic to conventional solid-state Li-ion battery manufacturing methods. Furthermore, other promising solid-state electrolyte materials have shown reactivity with the lithium nickel manganese oxides cathodes to form interfaces that are highly resistant to Li-ion conductivity.

When used as a solid electrolyte the material provided by the embodiments herein includes the following features:

(1) Very high Li-ion conductivity equivalent to garnet, Li$_7$La$_3$Zr$_2$O$_{12}$ may be used as a solid-state electrolyte.

(2) Cubic crystal structure of spinel means that the mechanical properties are isotropic, which greatly improves its mechanical properties under stressful conditions. Materials which are not uniform in all directions often crack during cooling after consolidation during sintering or hot-pressing. The cracks make the material less robust and reduce Li$^+$ ion conductivity.

(3) Certain elemental compositions provided by the embodiments herein can function as an electrode material with high conductivity. These solid solutions are single-phase unlike conventional solutions, which are physical composites of the solid electrolyte and the solid cathode material. The conventional composites suffer from poor Li$^+$ ion conductivity at the interface between the electrolyte phase and the electrode phase. Conversely, in the embodiments herein, the two phases are replaced by a single-phase material thus eliminating this problem. Furthermore, during high temperature consolidation of the two phases, often other impurity phases arise further reducing the performance.

(4) The materials provided by the embodiments herein are oxides and therefore are stable in air and can be synthesized and handled in air. This is similar to Garnet, Li$_7$La$_3$Zr$_2$O$_{12}$, but has an advantage over sulfide electrolytes.

(5) The embodiments herein may create a fully spinel structured, fully solid-state battery based on the compositions described above thus creating the opportunity to have fast charge and fast discharge since the high Li conductivity can be engineered throughout the solid battery. This will have application for high energy lasers, power tools, and other applications requiring a fast, capacitor-like discharge yet maintain the energy density of a Li-ion battery and for fast charging in minutes instead of hours.

(6) Enable use of a high voltage, LNMO, cathode which cannot conventionally be used owing to lack of stable electrolyte. This cathode is of interest because of its high energy density, power density and use of abundant and inexpensive elements (Cobalt-free), and thus there is great desire to reduce or eliminate use of Co in Li-ion batteries.

The embodiments herein overcome the deficiencies of the conventional solutions in a unique way by providing a spinel structure, which enables the formation of a solid solution with existing spinel structured solid electrodes, LNMO positive electrode, $LiMn_2O_4$ positive electrode, and $Li_4Ti_5O_{12}$ positive electrodes. This differentiates the embodiments herein completely from existing solid electrolytes, which generally cannot form a solid solution and therefore suffer from problems at the interface between the solid electrolyte and the solid electrode. These problems include chemical reactivity to form impurity phases at the interface and poor Li+ ion conductivity at the interface. The embodiments herein also provide lightweight elements relative to other oxide ion conductors such as $Li_7La_3Zr_2O_{12}$. Furthermore, relative to sulfide electrolyte which are not stable in air, the material provided by the embodiments herein is air stable. Moreover, the embodiments herein enable the use of LNMO electrode.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A composition of matter comprising $Li_{1.25}Cr_{0.25}Ti_{1.5}O_4$ (LCTO) or $Li_{1.25}Al_{0.25}Tl_{1.5}O_4$ (LATO), and
   a second composition of matter a spinel crystal structure electrode material selected from one of $LiNi_{0.5}Mn_{1.5}O_4$ (LNMO), $LiMn_2O_4$, or $Li_4Ti_5O_{12}$, and further combined with composites of $Li_3BO_3$ (LBO),
   wherein the spinel crystal structure electrode material comprises a single-phase spinel structure.

2. The composition of matter of claim 1, wherein the spinel crystal structure electrode material and the second composition of matter comprising composites with $Li_3BO_3$ (LBO) are provided as solid-state electrolytes and cathodes.

3. The composition of matter of claim 2, wherein solid-state electrolytes form an electrochemically-active solid solution with the spinel crystal structure electrode material enabling single-phase fully-solid electrodes and interface free solid cathodes.

* * * * *